Feb. 3, 1925.
M. D. MANN, JR., ET AL
1,525,140
REMOVAL OF HYDROGEN SULPHIDE FROM GAS
Filed June 4, 1921
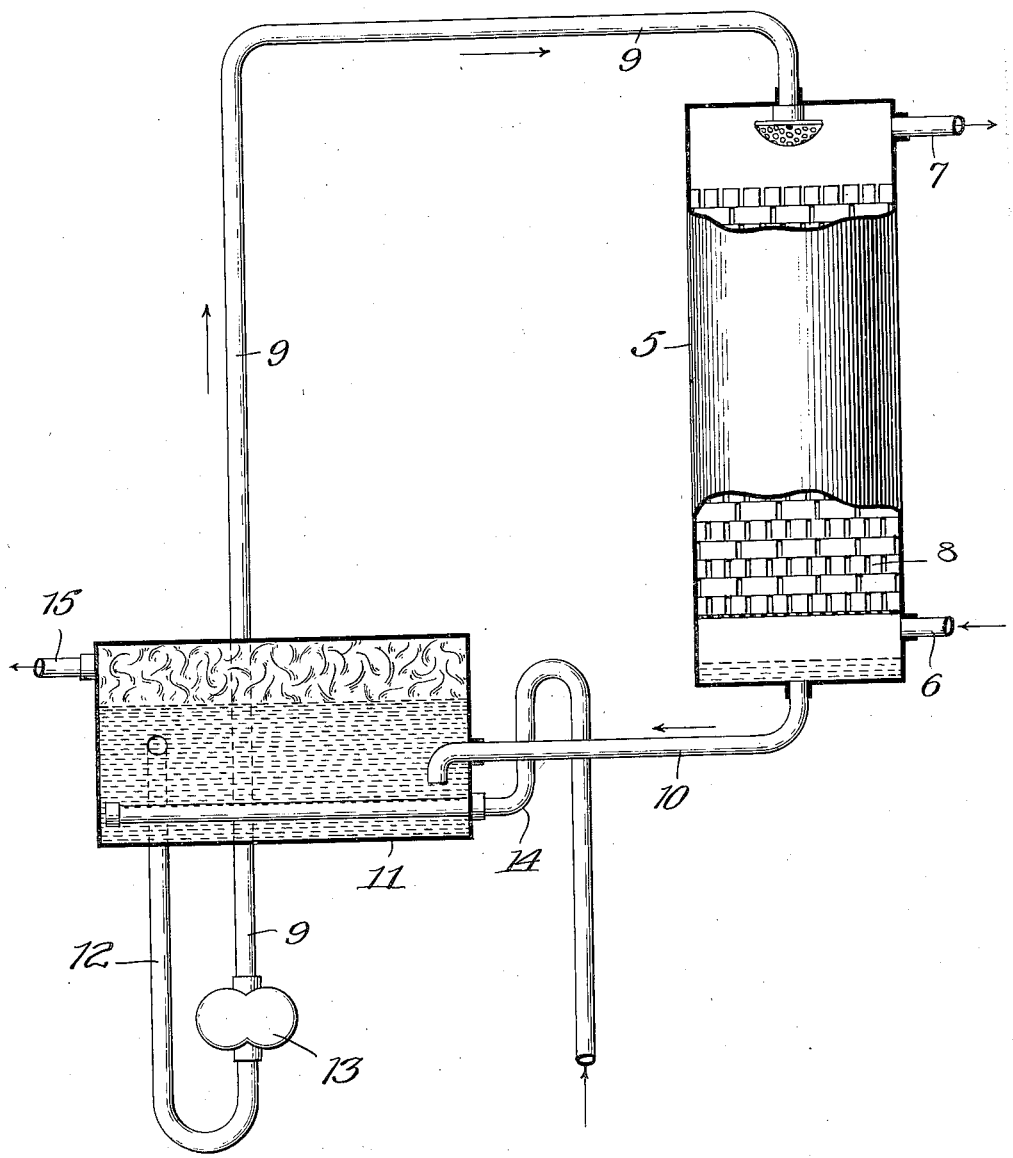
Inventors:
Matthew D. Mann Jr.,
Robert B. Lebo, Patented Feb. 3, 1925.

1,525,140

UNITED STATES PATENT OFFICE.

MATTHEW D. MANN, JR., OF ROSELLE, AND ROBERT B. LEBO, OF ELIZABETH, NEW JERSEY, ASSIGNORS TO STANDARD DEVELOPMENT COMPANY, A CORPORATION OF DELAWARE.

REMOVAL OF HYDROGEN SULPHIDE FROM GAS.

Application filed June 4, 1921. Serial No. 475,149.

*To all whom it may concern:*

Be it known that we, MATTHEW D. MANN, Jr., and ROBERT B. LEBO, citizens of the United States, residing at 625 Locust Street, Roselle, New Jersey, and 317 Cherry Street, Elizabeth, New Jersey, respectively, in the county of Union and State of New Jersey, have invented a new and useful Improvement in the Removal of Hydrogen Sulphide from Gas, of which the following is a specification.

The present invention relates to the purifying of gases and more particularly to the removal of hydrogen sulphide from gases such as those of oil refineries. It will be fully understood from the following description illustrated by the accompanying drawing in which apparatus for carrying out the invention is shown in diagrammatic arrangement and partially in section.

Referring more particularly to the drawing, the numeral 5 indicates a purifying tower into which the gas to be purified is introduced through pipe 6 near the bottom of the tower and passes out through pipe 7 near the top of the tower. The tower may suitably be filled above the gas inlet with a suitable packing or filling material indicated by the numeral 8. The purifying liquid for the treatment of the gas enters the tower at its top through pipe 9, and passes downwardly therethrough. In its downward passage it is brought into intimate contact with the ascending gas, both the gas and the purifying liquid being distributed by the packing material in the tower. The purifying liquid passes out of the tower through pipe 10, which discharges it into a tank 11. From this tank it is withdrawn through pipe 12 by pump 13, which forces it through pipe 9 into the tower. The liquid is thus circulated through the tower and is repeatedly reused until its efficiency is reduced to such a point that it cannot further be effectively used for the purification of the gas. The circulation of the liquid through the tower is then stopped and the liquid collected in the tank 11 is blown with air supplied through the perforated pipe 14.

The circulation of the liquid through the tower in countercurrent to the gas and its revivification may be effected simultaneously, the process then being continuous in all respects.

The purifying liquid contains ferric oxide in suspension and likewise contains a small proportion of alkali such as sodium hydroxide or sulphide. A suitable liquid may contain 3% of iron oxide in suspension and 1% of sodium hydroxide in solution. As the purifying liquid contacts with the gas containing hydrogen sulphide, it appears that sulphides and hydrosulfids of the alkali metal and sulphides of iron are formed. The sulfur compounds of the alkali metal appear to be formed first, and they appear to increase the dispersion and the reactivity of the iron oxide. When the liquid is blown with air in the tank 11, the sulphide of iron is converted into iron oxide and free sulfur is liberated. With a solution of this character, a thick foam is produced in the tank 11 on blowing with air and this foam appears to contain a very large proportion of the liberated sulfur. The foam overflows from the tank through the pipe 15 and the solution is thereby freed, to a very considerable extent, of the free sulfur. The dry solids of the foam have been found to contain as high as 70 to 75% of sulfur. It is readily apparent that a number of purifying tanks 11 may be provided, of which, in case of discontinuous operation, one or more will be employed for the revivification of the purifying liquid while the remainder are employed for the circulation of purifying liquid into the gas treating towers. It is likewise readily apparent that a battery of the gas purifying towers may be employed.

The proportion of iron oxide and alkali material in the purifying liquid may, of course, be varied and to a certain extent depends upon the proportion of hydrogen sulphide in the gas to be treated. Thus a liquid such as that above described may be used for the treatment of gas containing from 300 to 800 grains of hydrogen sulphide per 100 cubic feet of gas. A solution containing 2% of sodium hydroxide and 7% of iron oxide has likewise given successful results in practice. After revivification the proportion of alkali material may be restored by addition of fresh quantities thereof.

Although the present invention has been described in connection with the specific details of an embodiment thereof, it is not intended that these details shall be regarded as limitations upon the scope of the invention, except in so far as included in the accompanying claims.

I claim:

1. The process of regenerating a spent liquid employed for removing hydrogen sulphide from gases, said spent liquid comprising iron sulphide suspended in an alkaline solution, which comprises subjecting it to the action of an oxidizing agent, whereby free sulfur is formed, and agitating it, whereby a foam is produced containing a large proportion of the free sulfur, and removing said foam.

2. The process of regenerating a spent liquid employed for removing hydrogen sulphide from gases, said spent liquid comprising iron sulphide suspended in an alkaline solution, which comprises forcing a gaseous oxidizing agent therethrough, whereby iron oxide and free sulfur are formed and a foam is produced containing a greater portion of the free sulfur, and removing said foam.

3. The process of regenerating a spent liquid employed for removing hydrogen sulphide from gases, said spent liquid comprising iron sulphide suspended in an alkaline solution, which comprises forcing air through said solution, whereby iron oxide and free sulfur are formed and a foam is produced containing the greater portion of the free sulfur, and removing the foam.

MATTHEW D. MANN, Jr.
ROBERT B. LEBO.